United States Patent
Shima et al.

(10) Patent No.: US 9,515,887 B2
(45) Date of Patent: Dec. 6, 2016

(54) COMMUNICATION PROCESSING DEVICE, COMMUNICATION PROCESSING METHOD, AND PROGRAM

(71) Applicant: Sony Computer Entertainment Inc., Tokyo (JP)

(72) Inventors: Koji Shima, Kanagawa (JP); Kenjiro Komaki, Saitama (JP); Hikaru Mitsuhashi, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 208 days.

(21) Appl. No.: 14/285,764

(22) Filed: May 23, 2014

(65) Prior Publication Data

US 2014/0365627 A1    Dec. 11, 2014

(30) Foreign Application Priority Data

Jun. 6, 2013 (JP) ................................. 2013-120236

(51) Int. Cl.
G06F 15/173    (2006.01)
H04L 12/24    (2006.01)

(52) U.S. Cl.
CPC ....... *H04L 41/0893* (2013.01); *H04L 41/0896* (2013.01); *H04L 41/5022* (2013.01)

(58) Field of Classification Search
CPC ...................... H04L 41/0893; H04L 41/0896; H04L 41/5022
See application file for complete search history.

(56) References Cited

U.S. PATENT DOCUMENTS

| | | | | |
|---|---|---|---|---|
| 5,842,040 A | * | 11/1998 | Hughes | ............... H04L 63/0254 710/11 |
| 7,133,923 B2 | | 11/2006 | MeLampy | |
| 8,032,653 B1 | * | 10/2011 | Liu | ......................... H04L 47/10 370/235.1 |
| 2002/0169887 A1 | | 11/2002 | MeLampy | |
| 2005/0203910 A1 | * | 9/2005 | Taguchi | ................ G06F 3/0605 |

(Continued)

FOREIGN PATENT DOCUMENTS

| | | |
|---|---|---|
| JP | 10-164533 A | 6/1998 |
| JP | 2003218925 A | 7/2003 |

(Continued)

OTHER PUBLICATIONS

Office Action for corresponding JP Patent Application No. No. 2013-120236, dated Aug. 25, 2015.

(Continued)

*Primary Examiner* — Scott B Christensen
(74) *Attorney, Agent, or Firm* — Matthew B. Dernier, Esq.

(57) ABSTRACT

A communication processing device including: a storage section configured to store a policy table associating an identifier identifying a communication unit with an identifier of a policy applied to the communication unit and a priority; an obtaining section configured to refer to the policy table and obtain the identifier of the policy and the priority, the identifier of the policy and the priority being associated with the identifier of the communication unit, at a time of protocol processing of the communication unit; a policy applying section configured to group one or more communication units associated with an identifier of an identical policy, and apply the identical policy to the grouped one or more communication units; and a band control section configured to perform band control on a basis of the priority for each communication unit.

9 Claims, 11 Drawing Sheets

(56) References Cited

U.S. PATENT DOCUMENTS

2006/0176808 A1* 8/2006 Isobe ................. H04L 47/10
  370/229
2006/0187942 A1* 8/2006 Mizutani ............ H04L 12/5695
  370/401
2008/0228932 A1* 9/2008 Monette ............. H04L 47/10
  709/229

FOREIGN PATENT DOCUMENTS

| JP | 2004-080524 A | 3/2004 |
| JP | 4002511 B2 | 11/2007 |
| JP | 2008107919 A | 5/2008 |
| JP | 2010097274 A | 4/2010 |
| WO | 02058349 A1 | 7/2002 |
| WO | 2004/057812 A1 | 7/2004 |

OTHER PUBLICATIONS

Office Action for corresponding JP Patent Application No. No. 2013-120236, dated Jun. 2, 2015.
Office Action for corresponding JP Patent Application No. No. 2013-120236, pp. 1-4, dated Jan. 13, 2016.

* cited by examiner

FIG. 2A

| SOCKET ID | POLICY NUMBER | PRIORITY |
|---|---|---|
| 3 (UDP) | 0 | 31 |
| 8 (TCP) | 0 | 3 |
| 10 (TCP) | 2 | 10 |
| 11 (TCP) | 3 | 12 |
| 15 (TCP) | 0 | 2 |
| ... | ... | ... |

FIG. 2B

| POLICY NUMBER | UPPER LIMIT BAND (Mbps) | LOWER LIMIT BAND (Mbps) |
|---|---|---|
| 0 | 50 | 40 |
| 1 | 50 | 10 |
| 2 | 40 | 10 |
| 3 | 20 | 10 |
| ... | ... | ... |

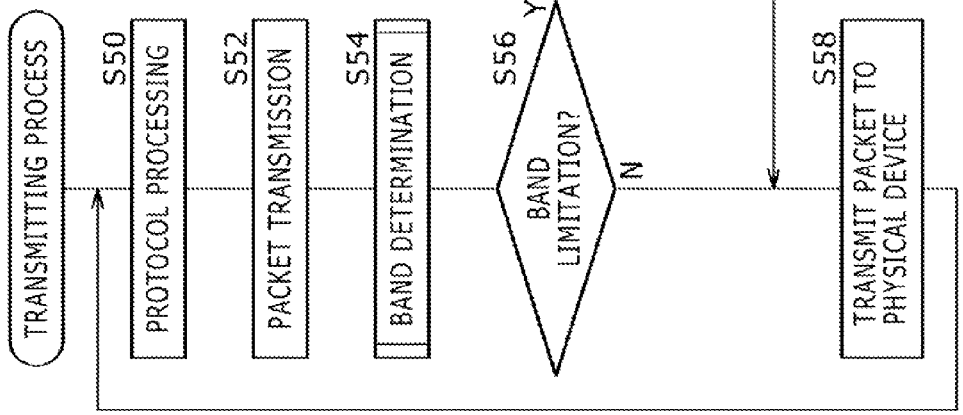
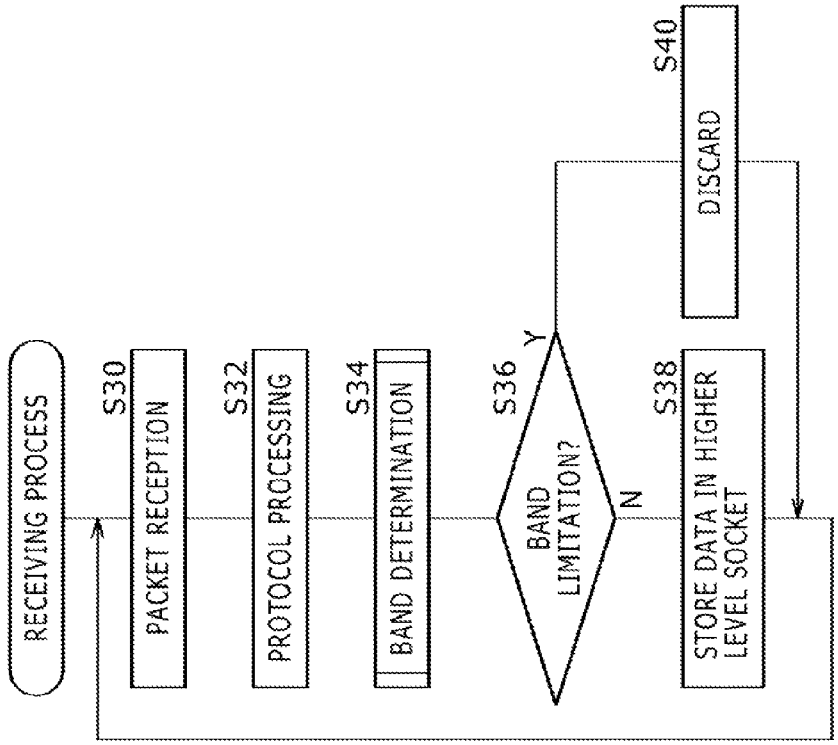

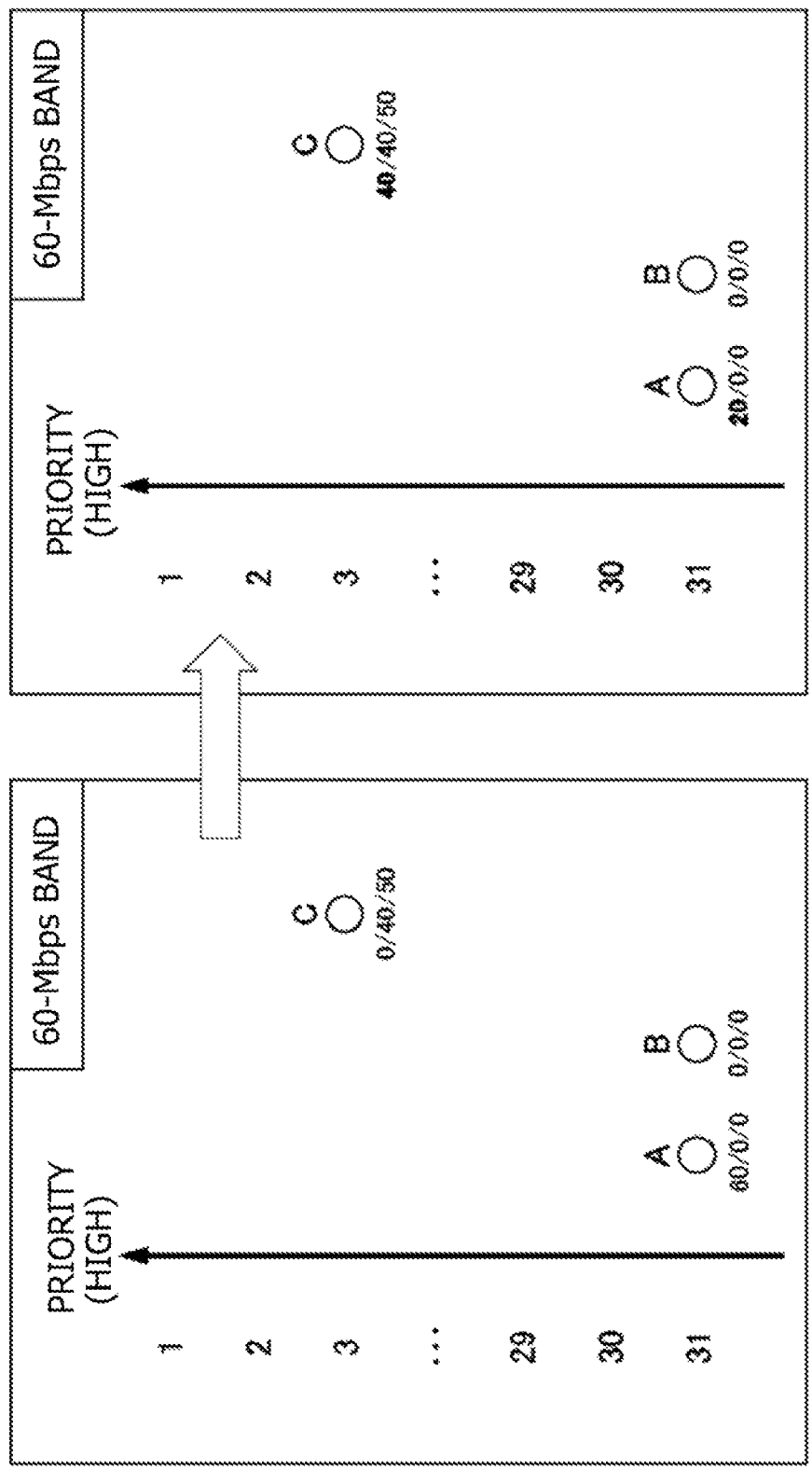

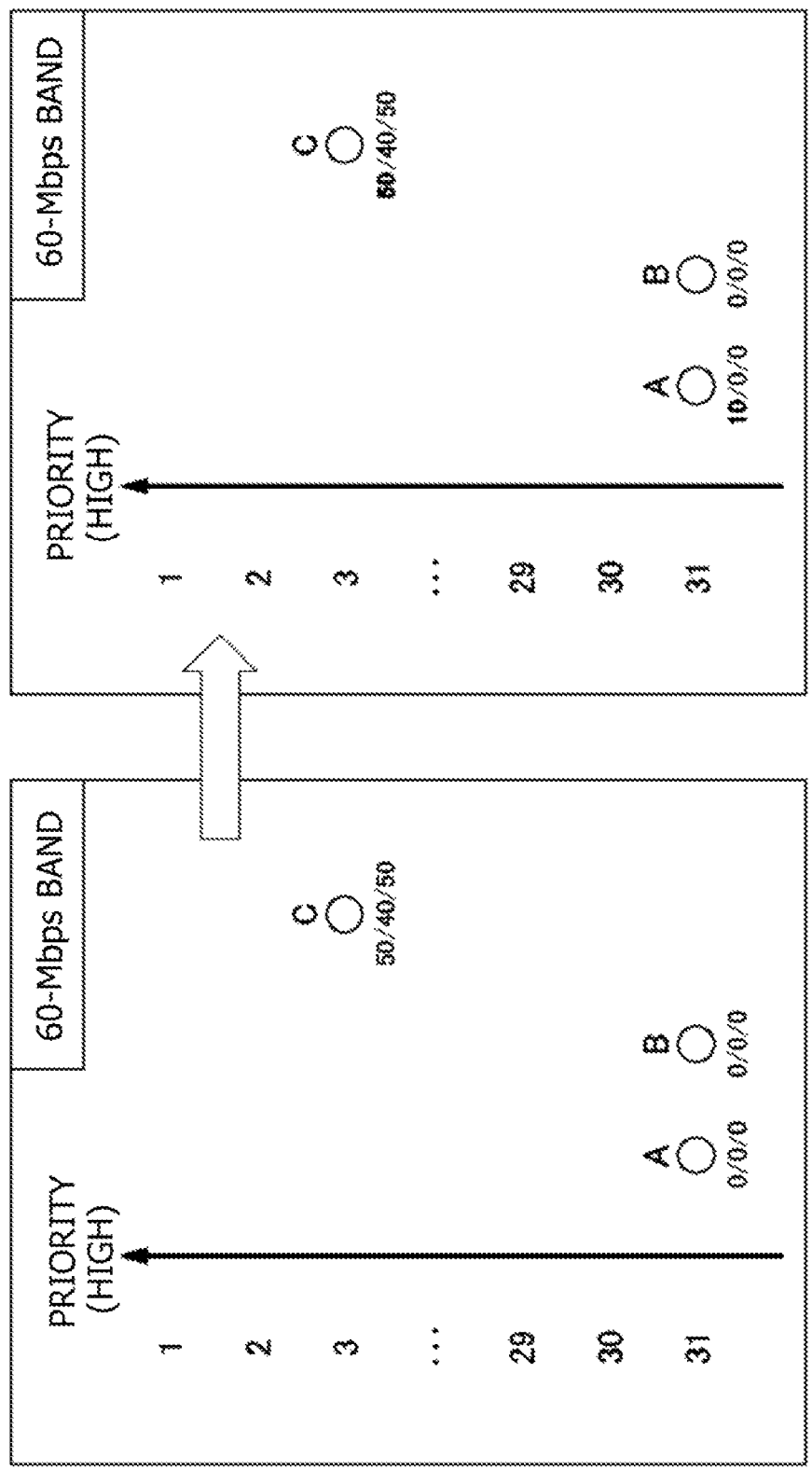

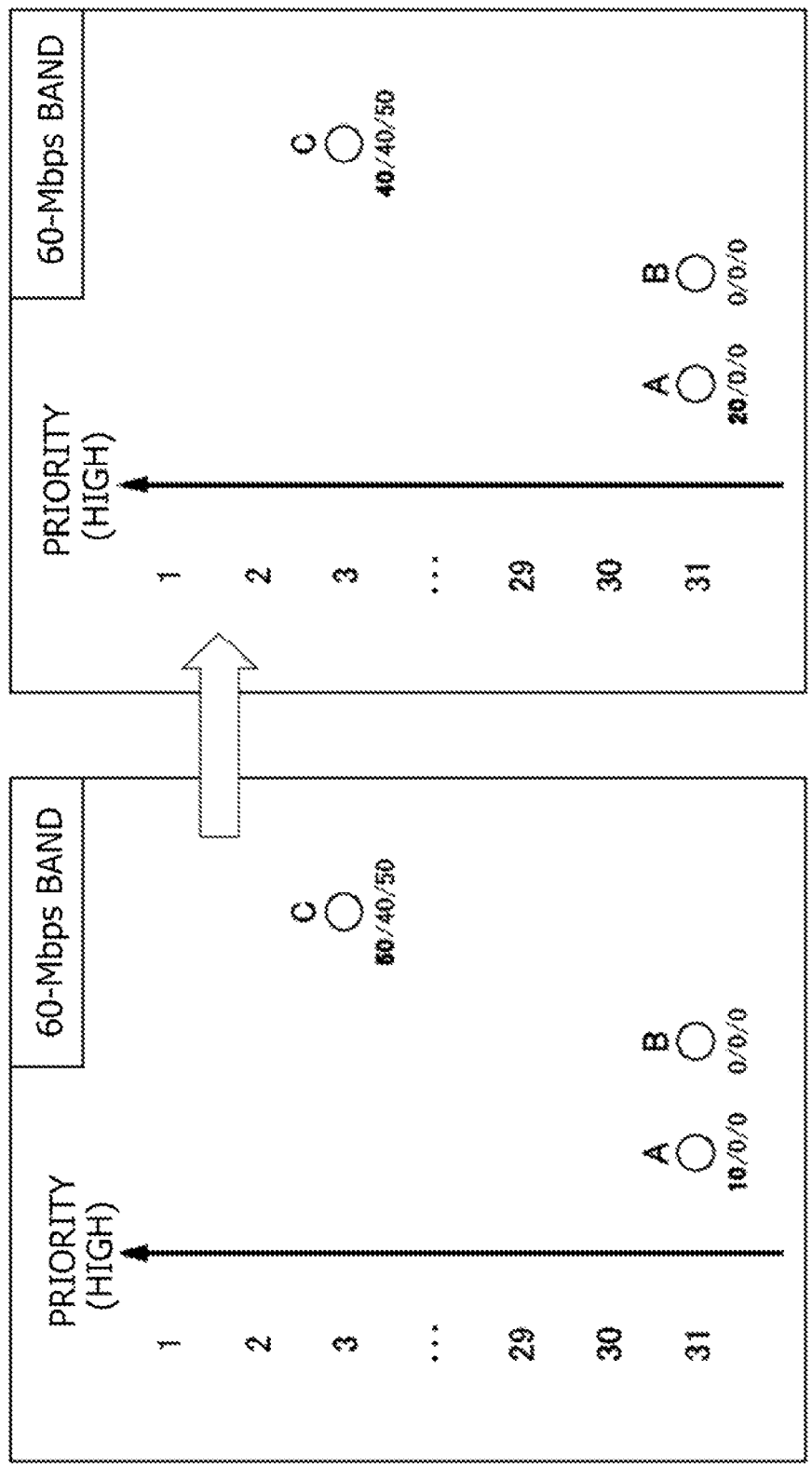

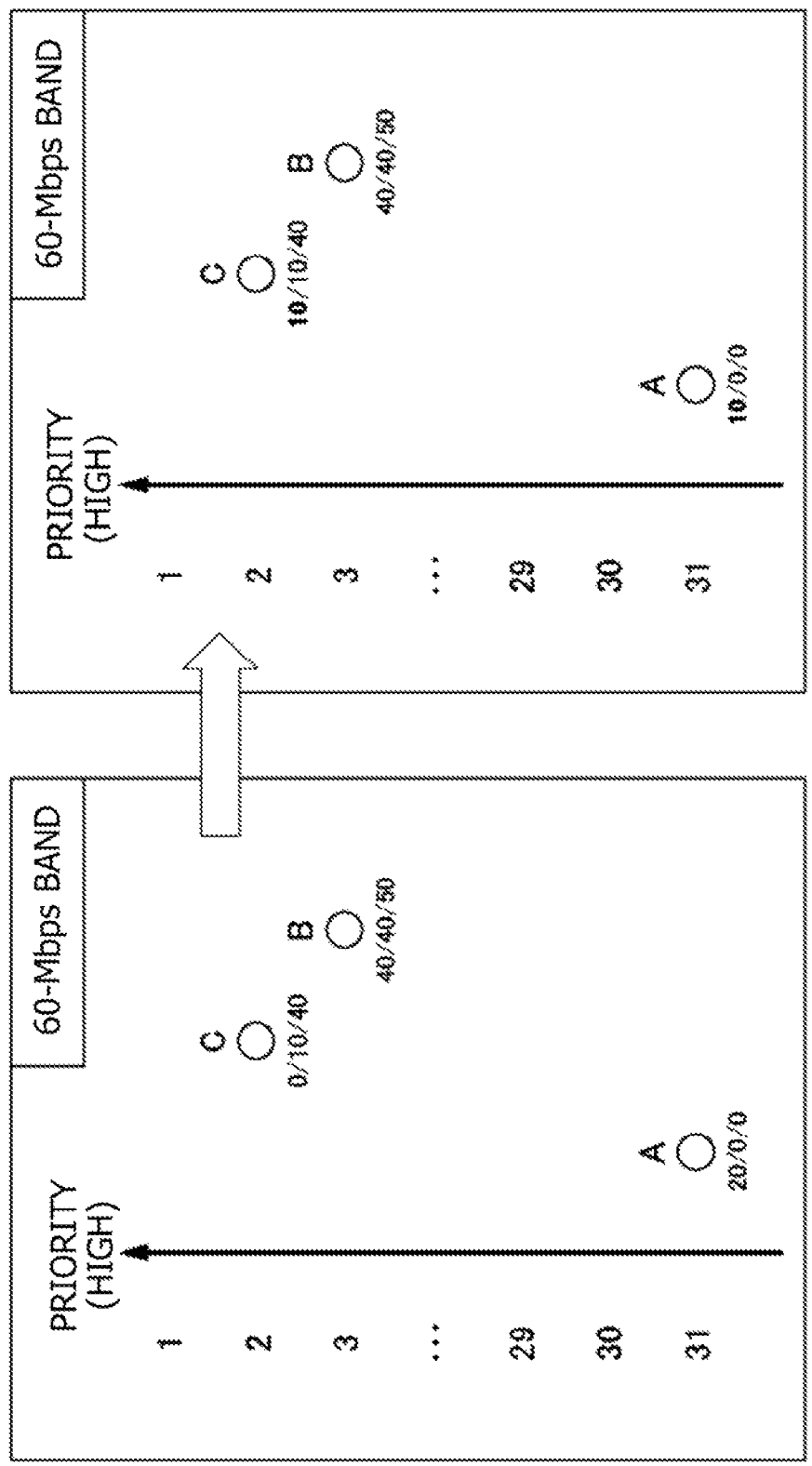

COMMUNICATION PROCESSING DEVICE, COMMUNICATION PROCESSING METHOD, AND PROGRAM

BACKGROUND

The present technology relates to a communication processing device and a communication processing method.

With the spread of broadband networks, it has become common to connect a personal computer to a network and have video and audio streams distributed. Further, various kinds of apparatuses such as a television receiving device, a video recorder, a game machine, a portable telephone, and the like have a communication function, and are connected to a home networking together with a personal computer, or connected to an external network via a home server, a router, or the like to use various network applications.

Japanese Patent Laid-Open No. 2010-97274 discloses a communication processing technology that can group socket communications and apply a same policy to the grouped socket communications.

SUMMARY

In an environment in which a plurality of applications use a network simultaneously, when a particular application occupies a network band, a problem occurs in that the network band cannot be sufficiently allocated to the other applications. The problem occurs in for example a case where a game application and a voice chat operate simultaneously and a case where a game application and a background download operate simultaneously. Here, a background download refers to downloading in the background of another application or data independent of a game during the game.

In addition, when the plurality of applications intend to use the network band as much as possible simultaneously, contention occurs between a band requests of applications, and thus the service quality of the individual applications cannot be maintained.

The present technology has been made in view of such problems. It is desirable to provide a communication processing technology that can appropriately allocate a network band to a plurality of communications.

A communication processing device according to a mode of the present technology includes: a storage section configured to store a policy table associating an identifier identifying a communication unit with an identifier of a policy applied to the communication unit and a priority; an obtaining section configured to refer to the policy table and obtain the identifier of the policy and the priority, the identifier of the policy and the priority being associated with the identifier of the communication unit, at a time of protocol processing of the communication unit; a policy applying section configured to group one or more communication units associated with an identifier of an identical policy, and apply the identical policy to the grouped one or more communication units; and a band control section configured to perform band control on a basis of the priority for each communication unit.

Another mode of the present technology is a communication processing method. This method includes referring to a table associating an identifier identifying a communication unit with a requested band and a priority of the communication unit, and when a sum of a requested band of a communication unit having a higher priority than a priority of interest and a consumed band of a communication unit having the priority of interest is larger than a maximum band of a network, performing band control on the communication unit having the priority of interest.

Yet another mode of the present technology is a program. This program for a computer, including: referring to a policy table associating an identifier identifying a communication unit with an identifier of a policy applied to the communication unit and a priority, and obtaining the identifier of the policy and the priority, the identifier of the policy and the priority being associated with the identifier of the communication unit, at a time of protocol processing of the communication unit; and grouping one or more communication units associated with an identifier of an identical policy, and applying the identical policy to the grouped one or more communication units.

This program may be provided as a part of basic software incorporated in an operating system or a library. In order to provide such firmware, basic software, or a library, or in order to update a part of these programs, a computer readable recording medium on which these programs are recorded may be provided. In addition, these programs may be transmitted by a communication line.

Yet another mode of the present technology is a communication processing method. This method includes referring to a policy table associating an identifier identifying a communication unit with an identifier of a policy applied to the communication unit and a priority, and obtaining the identifier of the policy and the priority, the identifier of the policy and the priority being associated with the identifier of the communication unit, at a time of protocol processing of the communication unit, and grouping one or more communication units associated with an identifier of an identical policy, and applying the identical policy to the grouped one or more communication units.

It is to be noted that arbitrary combinations of the above constituent elements and modes obtained by converting expressions of the present technology between a method, a device, a system, a computer program, a data structure, a recording medium, and the like are also effective as modes of the present technology.

According to the present technology, a network band can be allocated to a plurality of communications appropriately.

BRIEF DESCRIPTION OF THE DRAWINGS

FIGS. 2A and 2B are diagrams of assistance in explaining a table stored in a policy table storage section in FIG. 1;

FIG. 5A is a flowchart of assistance in explaining band control on a receiving side, and FIG. 5B is a flowchart of assistance in explaining band control on a transmitting side;

FIG. 6A and FIG. 6B are diagrams of assistance in explaining an example of band control;

FIG. 8A and FIG. 8B are diagrams of assistance in explaining another example of band control;

FIG. 9A and FIG. 9B are diagrams of assistance in explaining another example of band control;

FIG. 10A and FIG. 10B are diagrams of assistance in explaining another example of band control.

DETAILED DESCRIPTION OF THE PREFERRED EMBODIMENTS

Figure 1:
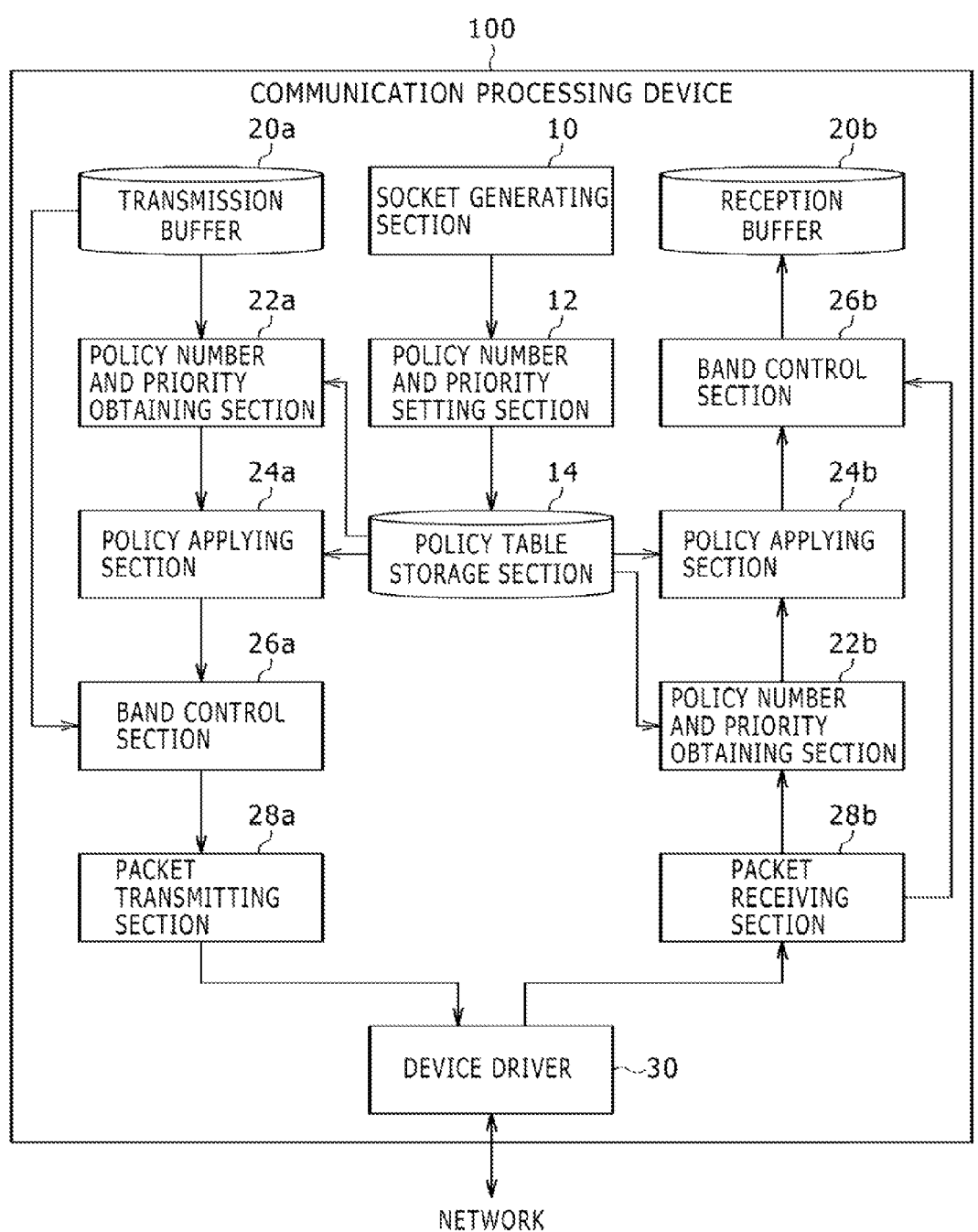
FIG. 1 is a block diagram of a communication processing device according to an embodiment.

FIG. 1 is a block diagram of a communication processing device 100 according to an embodiment. The following description will be made of a case where the communication processing device 100 is connected to a network, and constitutes a part of functions of a server or a client. However, the communication processing device 100 can also be made to function as an emulator capable of emulating states of a network on a local network without being actually connected to a real network such as the Internet or the like. In that case, the communication processing device 100 is for example used by a game application developer to assume a network environment and adjust the behavior of a game program and various kinds of parameters.

A socket generating section 10 receives a socket generating command from an application, and generates a socket for a socket communication. At this time, a socket ID uniquely identifying the socket is set. This socket ID is a socket identification number arbitrarily assigned at the time of the generation of the socket in the socket communication, and is specifically a socket descriptor returned when socket generation has succeeded at a Berkeley Software Distribution (BSD) socket.

A policy number and priority setting section 12 sets a policy number uniquely identifying a policy to be applied to the socket communication and a priority of the socket communication, and stores a socket-policy correspondence table associating the socket ID of the socket communication, the policy number, and the priority with each other in a policy table storage section 14. The policy number is set in a part of a data structure of the socket. The application can set the policy number of the socket by a function that sets the parameter of the socket, such as setsockopt( ) or the like, and obtain the policy number of the socket by a function that obtains the parameter of the socket, such as getsockopt( ) or the like.

FIGS. 2A and 2B are diagrams of assistance in explaining the table stored in the policy table storage section 14.

FIG. 2A shows the socket-policy correspondence table. The socket-policy correspondence table stores the IDs of sockets generated by the socket generating section 10 and the numbers of policies applied to the sockets and priorities, which numbers and priorities are set by the policy number and priority setting section 12, in association with each other. In the present example, a policy number "0" is set to a socket ID "3," a socket ID "8," and a socket ID "15," a policy number "2" is set to a socket ID "10," and a policy number "3" is set to a socket ID "11." A communication for the socket ID "3" uses User Datagram Protocol (UDP), and communications for the other sockets ID use Transmission Control Protocol (TCP).

Further, priorities "31," "3," "10," "12," and "2" are set to the sockets ID "3," "8," "10," "11," and "15," respectively. The priorities assume a value of 1 to 31, as an example. The smaller the value, the higher the priority.

There are M socket IDs. The policy numbers assume a value of 0 to N. In general, a maximum number of policies that can be set is smaller than a maximum number of sockets that can be generated. Therefore, the socket IDs and the policy numbers are in many-to-one correspondence with each other. Thus associating the socket IDs and the policy numbers with each other enables socket communications to be grouped according to applied policies.

In the example of FIG. 2A, three socket IDs "3," "8," and "15" are associated with the same policy number 0. Three socket communications identified by these socket IDs belong to one policy group.

For example, when a distinction is made such that the policy number "0" is for system communications, and the policy number "2" is for game communications, the communications can be controlled under different policies while the socket communications belonging to the policy number "0" are differentiated from the socket communications belonging to the policy number "2."

FIG. 2B shows a policy definition table. The policy definition table stores parameters of policies such as limit bands, policy patterns, policy flags, and the like in association with the policy numbers.

As shown in FIG. 2B, the policy definition table stores upper limit bands (Mbps) and lower limit bands (Mbps) in association with the policy numbers. When limit bands on a transmitting side are distinguished from limit bands on a receiving side, a transmission upper limit band, a transmission lower limit band, a reception upper limit band, and a reception lower limit band are set.

In the example of FIG. 2B, an upper limit band of 50 Mbps and a lower limit band of 40 Mbps are set to the policy number "0," an upper limit band of 50 Mbps and a lower limit band of 10 Mbps are set to the policy number "1," an upper limit band of 40 Mbps and a lower limit band of 10 Mbps are set to the policy number "2," and an upper limit band of 20 Mbps and a lower limit band of 10 Mbps are set to the policy number "3."

A priority and a requested network band can be thus set for each socket. Operation is performed such that bands specified from sockets having high priorities are consumed. When there are a plurality of sockets having a same priority, a band is equally consumed by the sockets having the same priority. There are an upper limit and a lower limit to the specified network bands. The upper limit network band indicates a request such that "this allocated amount is sufficient for this socket" or "other sockets may be accommodated with an amount by which this upper limit network band is exceeded." The lower limit network band indicates a request such that "at least this amount is desired to be allocated to this socket (though depending on the priority and the actual band)." However, the lower limit network band of a socket where no communication has occurred is treated as zero at the point in time. The upper limit network band is set so as not to be less than the lower limit network band, but the same value as the lower limit network band can be set as the upper limit network band.

In the present embodiment, operations for the upper limit network band and the lower limit network band are different from each other in cases where an actually used band exceeds the upper limit network band or the lower limit network band. For example, suppose that in a communication in which the upper limit network band is set at 5 Mbps and the lower limit network band is set at 2 Mbps, a band actually used by the communication in question is 3 Mbps. In such a case, the used band is less than the 5 Mbps of the upper limit network band, and exceeds the 2 Mbps of the lower limit network band. Thus, band control on the communication in question is not performed. Therefore 2 Mbps of the remaining band less than the upper limit network band is naturally yielded to other communications, so that communications are averaged. On the other hand, when the band being used by the communication in question is about to exceed the 5 Mbps of the upper limit network band, band control on the communication in question is performed to actively accommodate sockets having lower priorities with a band. Further, suppose that the band actually being used by the communication in question is 1 Mbps. In this case, the used band is less than the 2 Mbps of the lower limit network band, and there is 1 Mbps remaining before the lower limit network band is reached. However, sockets having lower priorities are not accommodated with this remaining band. This is because at least the lower limit network band needs to be secured for the communication in question.

In the present embodiment, band control is performed using a priority and a lower limit network band. As for an upper limit network band, band control is performed when an amount of communication of a socket reaches the upper limit value, but otherwise band control is not performed.

In order to specify a network band, either bps or a ratio (percentage) to an entire available band is used.

In addition to the upper limit bands and the lower limit bands, policy patterns and policy flags may be set in the policy definition table in association with the policy numbers.

A policy pattern is a parameter that specifies whether the policy in question is set active (ON) or inactive (OFF). When the policy is active, band control to be described later is applied to a group of socket communications to which the policy in question is applied. When the policy is inactive, the band control to be described later is not applied to the group of socket communications to which the policy in question is applied.

A policy flag is a parameter that specifies a type of socket to which the policy in question is applied. For example, when the policy flag is a value indicating TCP, the policy in question is applied to a socket generated by TCP. When the policy flag is a value indicating UDP, the policy in question is applied to a socket generated by UDP.

The description returns to FIG. 1. A transmission buffer 20a, a policy number and priority obtaining section 22a, a policy applying section 24a, a band control section 26a, and a packet transmitting section 28a form a configuration used when an application transmits data using a socket. On the other hand, a reception buffer 20b, a policy number and priority obtaining section 22b, a policy applying section 24b, and a band control section 26b form a configuration used when an application receives data using a socket. These configurations are implemented in a protocol stack for socket communications.

Description will first be made of the configuration transmitting data through a socket. The transmission buffer 20a buffers the data to be transmitted by an application by a socket communication. The policy number and priority obtaining section 22a refers to the socket-policy correspondence table stored in the policy table storage section 14, and obtains a policy number and a priority associated with the ID of the socket used by the application. The policy number and priority obtaining section 22a supplies the obtained policy number and the obtained priority to the policy applying section 24a.

The policy applying section 24a refers to the policy definition table stored in the policy table storage section 14, and determines whether to apply a policy to a group of socket communications belonging to the policy number. When the policy pattern in the policy definition table is inactive (OFF), the policy in question is not applied to the socket communications. Even when the policy pattern is active (ON), the policy is not applied to a socket communication not using a type of socket specified by the policy flag among the socket communications belonging to the policy number. The policy applying section 24a notifies the band control section 26a whether or not to apply the policy to the socket communications and of limit bands corresponding to the policy number and the priority.

When the policy is applied to the socket communication, the band control section 26a applies band control to the socket communication on the basis of the limit bands corresponding to the policy number and the priority. The band control delays a packet to be transmitted.

The band control section 26a supplies the packet transmitting section 28a with the packet as a result of the band control being applied to the socket communication to which the policy is applied. The packet transmitting section 28a supplies the packet to the device driver 30. The device driver 30 transmits the packet to a network.

Description will next be made of the configuration receiving data through a socket. The device driver 30 receives a packet from the network, and supplies the packet to the packet receiving section 28b. The packet receiving section 28b receives the packet from the device driver 30. At this time, the packet receiving section 28b determines to which socket the packet is directed, from the transmission destination address and the port number of the packet.

The policy number and priority obtaining section 22b refers to the socket-policy correspondence table stored in the policy table storage section 14, obtains a policy number and a priority associated with the ID of the socket used in the communication in question, and notifies the policy number and the priority to the policy applying section 24b.

The policy applying section 24b refers to the policy definition table stored in the policy table storage section 14, and determines whether to apply a policy to a group of socket communications belonging to the policy number. This is similar to that in the case of transmission.

The band control section 26b applies band control to the socket communication to which the policy is applied on the basis of the limit bands corresponding to the policy number and the priority. The band control discards the received packet.

The packet to which the band control is applied by the band control section 26b is buffered in the reception buffer 20b. The application reads the data from the reception buffer 20b.

Figure 3:
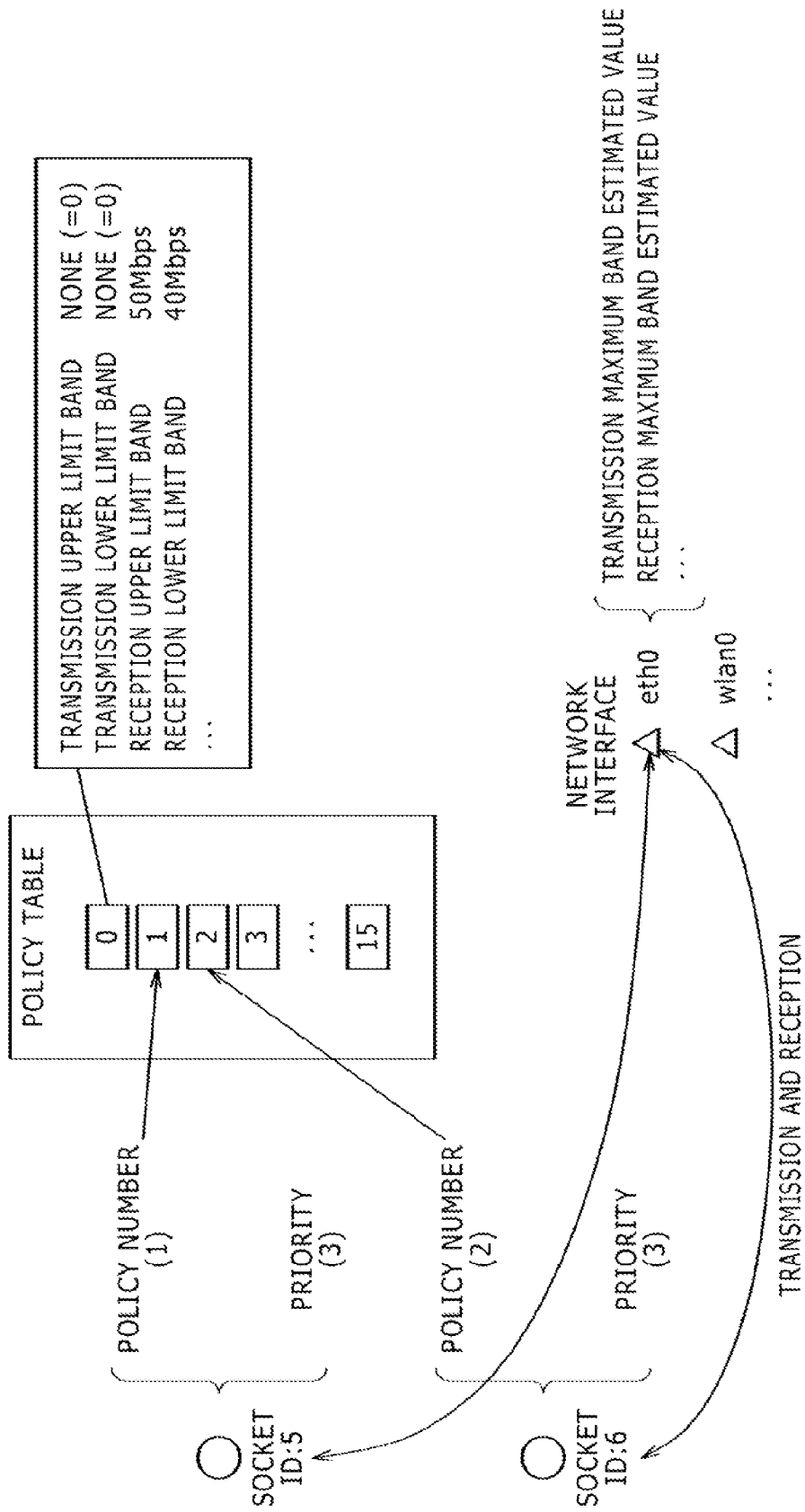
FIG. 3 is a diagram of assistance in explaining a relation between a policy number and a priority set for each socket Identification (ID) and a policy definition table.

FIG. 3 is a diagram of assistance in explaining a relation between a policy number and a priority set for each socket ID and the policy definition table.

A policy number "1" and a priority "3" are associated with a socket ID "5." A policy number "2" and a priority "3" are associated with a socket ID "6." A network interface for the socket IDs "5" and "6" is a wired Local Area Network (LAN) interface eth0, which is associated with a transmission maximum band estimated value and a reception maximum band estimated value. Other network interfaces include a wireless LAN interface wlan0.

The policy definition table stores transmission upper limit bands, transmission lower limit bands, reception upper limit bands, and reception lower limit bands in association with policy numbers 0 to 15. A transmission upper limit band 0 (no limitation), a transmission lower limit band 0 (no limitation), a reception upper limit band of 50 Mbps, and a reception lower limit band of 40 Mbps are stored for the policy number 0.

A socket communication identified by the socket ID "5" is subjected to band control under limit bands stored in the policy table of the policy number "1." A socket communication identified by the socket ID "6" is subjected to band control under limit bands stored in the policy table of the policy number "2."

Each socket can select the policy table of an arbitrary policy number. Both of a socket A and a socket B may select the policy table of a same policy number. For example, suppose that both of the socket A and the socket B select the policy table of the policy number "1," and that a lower limit band of 3 Mbps is set in the policy table of the policy number "1." In this case, each of the socket A and the socket B may be subjected to band control under the lower limit band of 3 Mbps. In this case, the socket A and the socket B each use a band of 3 Mbps, and use a band of 6 Mbps in total. Alternatively, as another example of implementation, a band may be shared between the socket A and the socket B for which the same policy number is set. In this case, the socket A and the socket B use a band of 3 Mbps in total, and the band of 3 Mbps is shared between the two sockets.

Figure 4:
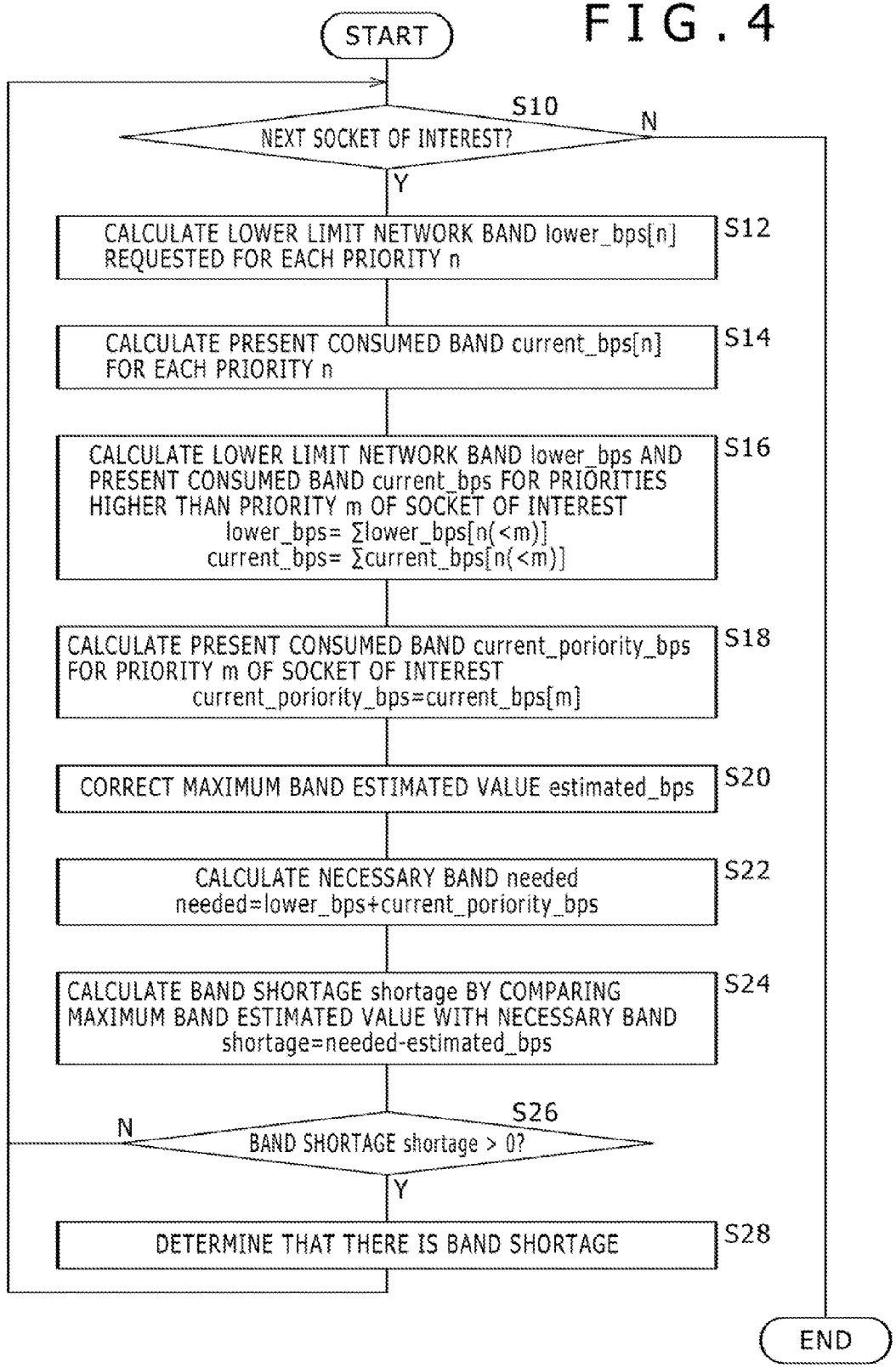
FIG. 4 is a flowchart of assistance in explaining a band determination process according to the present embodiment.

FIG. 4 is a flowchart of assistance in explaining a band determination process according to the present embodiment. This determination process is performed by the band control section 26a on the transmitting side and the band control section 26b on the receiving side.

One of sockets identified by socket IDs is selected as a socket of interest (S10).

A lower limit network band lower_bps[n] requested for each priority n is calculated (S12). When there are two or more sockets having the priority n, a sum of lower limit network bands requested by the respective sockets having the priority n is set as the lower limit network band lower_bps[n] requested for the priority n. However, the lower limit network band requested for a socket where no communication has occurred is set to zero.

A present consumed band current_bps[n] for each priority n is calculated (S14). Also in this case, when there are two or more sockets having the priority n, a sum of present consumed bands of the respective sockets having the priority n is set as the present consumed band current_bps[n] for the priority n. Here, it is to be noted that priority control on the sockets functions effectively by summing not only the consumed band of the socket of interest but also the consumed bands of the other sockets having the same priority as the socket of interest rather than the consumed band of only the socket of interest.

A lower limit network band lower_bps and a present consumed band current_bps are calculated for priorities higher than a priority m of the socket of interest (S16). This calculation can be performed by the following calculation equation:

$$\text{lower\_bps} = \Sigma \text{lower\_bps}[n(<m)]$$

$$\text{current\_bps} = \Sigma \text{current\_bps}[n(<m)]$$

where $\Sigma$ takes a sum for n smaller than m.

A present consumed band current_priority_bps for the priority m of the socket of interest is calculated (S18). This present consumed band is obtained by the following equation:

$$\text{current\_priority\_bps} = \text{current\_bps}[m]$$

A maximum band estimated value estimated_bps of the network interface used in socket communication is corrected (S20).

Here, a calculating method using actual amounts of transmission and reception is used as a method obtaining the maximum band estimated value. This method is different from a commonly known technology related to throughput estimation such as a maximum throughput estimating method described in Japanese Patent Laid-Open No. 2011-254433 or the like in that this method measures a maximum band on the basis of actual amounts of transmitted and received data. The maximum band estimating method according to the present embodiment estimates the maximum band with the value of the actual amounts of transmission and reception also taken into consideration when the actual amounts of transmission and reception show a tendency to increase. For example, a value obtained by multiplying the present maximum band by the tendency to increase is set as an estimated value. In addition, even after the maximum value is obtained once, estimated value adjustment processing is performed to prevent a peak value from being the maximum band estimated value at all times. For example, the estimation of the maximum band is started again when connection is changed to a different line. In addition, the maximum band may vary during use. It is accordingly desirable to update the estimated value dynamically by correcting the maximum band estimated value.

The maximum band estimated value estimated_bps is corrected as follows. Whether an actual transmission and reception band shows a tendency to increase is determined, and when the actual transmission and reception band shows a tendency to increase, the maximum band estimated value estimated_bps is interpreted as infinite. As a result, the application of band control is delayed. When the actual transmission/reception band is stabilized into a state in which calculation can be performed, the following calculation is applied.

$$\text{offset} = \text{lower\_bps} - \text{current\_bps}$$

This offset value offset indicates a degree by which the present consumed band current_bps is short of the requested lower limit network band lower_bps. When the offset value offset is zero or more, it is estimated that there is a possibility of the estimated band deviating from an actual maximum band, including a fact that the actual transmission/reception maximum band has dynamically changed at a part different from a transmitting and receiving terminal. Then, the maximum band estimated value is corrected on each of the transmitting side and the receiving side by temporarily setting maximum band estimated value estimated_bps=present maximum band−offset for the packet.

Next, a necessary band needed is calculated (S22). The necessary band needed is calculated as a sum of the lower limit network band lower_bps for the priorities higher than the priority m of the socket of interest and the present consumed band current_priority_bps for the priority m of the socket of interest, by the following calculation equation:

$$\text{needed} = \text{lower\_bps} + \text{current\_priority\_bps}$$

A band shortage shortage is calculated by comparing the maximum band estimated value with the necessary band (S24). The band shortage shortage is calculated as a difference between the necessary band needed and the maximum band estimated value estimated_bps, by the following calculation equation:

$$\text{shortage} = \text{needed} - \text{estimated\_bps}$$

Whether the band shortage shortage is positive, that is, whether there is a band shortage is determined (S26). When band shortage shortage>0 (Y in S26), it is determined that there is a band shortage (S28). After it is determined that there is a band shortage, the process returns to step S10.

When band shortage shortage≤0 (N in S26), the process returns to step S10 without determining that there is a band shortage.

When there is a next socket of interest to be processed in step S10 (Y in S10), the processing of step S12 and subsequent steps is performed for the socket of interest. When the processing of all sockets is ended (N in S10), a general band determination for each socket is ended.

In the above description, the lower limit network band lower_bps for the priorities higher than the priority m of the socket of interest is calculated by adding the lower limit network band lower_bps[n] requested for the priority n (<m). However, there are variations on the method of calculating the lower limit network band lower_bps. The following description will be made of two modifications.
(First Variation on Lower_bps Calculating Method)

When the lower limit network band lower_bps for the priorities higher than the priority m of the socket of interest is obtained, instead of typically adding the lower limit network band lower_bps[n] requested for the priority n (<m), an amount of communication under present conditions is taken into consideration, and min (present amount of communication×2, specified lower limit network band lower_bps[n]) is added, where min is an operation that obtains the smaller of the values. For example, suppose that the socket A has a priority of 16 and a lower limit band of 1 Gbps, and that the socket B has a priority of 20. When a very small amount of communication occurs in the socket A while the socket B is performing communication using a large band, a complete stop of the communication of the socket B can be avoided with this method of calculating the lower limit network band lower_bps.
(Second Variation on Lower_bps Calculating Method)

An amount of communication of the whole of sockets having priorities lower than the priority m of the socket of interest is taken into consideration in the above-described first variation on the method of calculating the lower limit network band lower_bps. In the first variation, when the lower limit network band lower_bps for the priorities higher than the priority m of the socket of interest is obtained, min (present amount of communication×2, lower_bps[n]) is added for the priority n (<m). In the second variation, when the amount of communication of the whole of sockets having priorities lower than the priority m of the socket of interest exceeds a predetermined usage rate, for example 90% of a network band, the specified lower limit network band lower_bps[n] is typically added instead of adding min (present amount of communication×2, lower_bps[n]). This enables band control to be applied also to a socket for which only a priority is specified without a lower limit network band being specified.

FIG. 5A is a flowchart of assistance in explaining band control on the receiving side by the communication processing device 100. FIG. 5B is a flowchart of assistance in explaining band control on the transmitting side by the communication processing device 100.

Band control at a time of reception will be described with reference to FIG. 5A. The packet receiving section 28b receives a packet from the network (S30). The received packet is subjected to protocol processing in each protocol layer (S32). The band control section 26b determines whether there is a band shortage under the limit band and the priority set for each socket (S34). Details of this band determination processing are as described with reference to FIG. 4.

When it is determined as a result of the band determination processing in step S34 that there is a band shortage (Y in S36), the received packet is discarded (S40). When it is not determined that there is a band shortage (N in S36), the data of the received packet is stored in a higher level socket (S38). The process returns to step S30 to receive a next packet and repeat the subsequent band control on the receiving side.

After the packet is received, it is not possible to determine to which socket the packet is directed in a device layer. Thus, the socket to which the packet is directed is determined by continuing protocol processing in each protocol layer. Because the present communication speed of each socket is known, it can be determined that the packet is to be discarded when the band determination indicates that a band is exceeded. At this time, flow control is performed in TCP by discarding the packet. Consequently the band of the socket is narrowed down automatically. Also in UDP, when the packet is discarded, the transmitting side adjusts a transmission speed. While the received packet can be delayed instead of being discarded, discarding the received packet is easier in implementation.

Band control at a time of transmission will be described with reference to FIG. 5B. Data transmitted using a socket is subjected to protocol processing in each protocol layer (S50). The packet transmitting section 28a generates a packet to be transmitted on the basis of the protocol processed data (S52). The band control section 26a determines whether there is a band shortage under the limit band and the priority set for each socket (S54). Details of this band determination processing are as described with reference to FIG. 4.

When it is determined as a result of the band determination processing in step S54 that there is a band shortage (Y in S56), the packet to be transmitted is delayed (S60). Incidentally, when there is not sufficient memory storing the delayed packet, the packet is discarded. When it is not determined that there is a band shortage (N in S56), the packet to be transmitted is transmitted to a physical device (S58). The process returns to step S50 to perform protocol processing of a next transmission packet and repeat the subsequent band control on the transmitting side.

Thus, on the transmitting side, when it is determined that there is a band shortage, the band control section 26a performs band control by delaying the transmission of the packet. On the receiving side, when it is determined that there is a band shortage, the band control section 26b performs band control by discarding the received packet. This band determination is made for each packet.

According to the band control according to the present embodiment, an application in a higher layer can be notified of a band control value imposed on the band-controlled socket, that is, a virtual network band. This enables the application to be provided with a hint about band allocation. For example, when the application has assumed that communication is performed at 60 Mbps, but realizes that actually the socket is limited to 20 Mbps, the application can adjust an amount of band shortage by decreasing a video rate, for example.

When a requested band is specified as a ratio (percentage) to a maximum band, a band limit value cannot be obtained unless the maximum band of the target network interface is known. However, in a state in which the maximum band cannot be measured in an initial stage of communication, a band to which the specified ratio (percentage) corresponds is not known, and thus a band control algorithm does not operate properly. Accordingly, in the present embodiment, whether an actual transmission and reception band shows a tendency to increase is determined, and when the actual transmission and reception band shows a tendency to increase, band control is delayed. Thus, the problem is avoided by not performing band control based on the specified ratio (percentage) in the initial stage of communication. Incidentally, the maximum band and the communication band of the socket may be provided for each network interface (physical device) that actually performs communication.

Band control according to the present embodiment will be described in the following using concrete examples with reference to FIGS. 6 to 11. In these examples, limit bands are specified in Mbps. However, similar band control is applicable to cases where limit bands are specified as ratios to a maximum band estimated value. In these figures, a circle denotes a socket, and the actual band and limit bands of each socket are shown below the circle in a form of actual band (Mbps)/specified lower limit band (Mbps)/specified upper limit band (Mbps). In the following examples, suppose that the maximum band estimated value is 60 Mbps.

In FIG. 6A and FIG. 6B, the priority of a socket A and a socket B is 31, and the priority of a socket C is 3. In the state of FIG. 6A, the actual band and the limit bands of the socket A are 60/0/0, the actual band and the limit bands of the socket B are 0/0/0, and the actual band and the limit bands of the socket C are 0/40/50. Suppose that the socket C has started communication in this state.

In FIG. 6A, the lower limit network band lower_bps for priorities higher than the priority 31 of the socket A of interest is 0 Mbps (lower limit network band for the socket C where no communication has occurred is treated as zero). The present consumed band current_priority_bps for the priority 31 of the socket A of interest is 60 Mbps. Thus, the necessary band needed is 0 Mbps+60 Mbps=60 Mbps. The band shortage shortage is 60 Mbps−60 Mbps=0 Mbps. It is determined that there is a sufficient band at this point in time.

When the actual band of the socket C becomes 1 Mbps, the lower limit network band lower_bps for the priorities higher than the priority 31 of the socket A of interest is 40 Mbps, and the present consumed band current_priority_bps for the priority 31 of the socket A of interest is 60 Mbps. Thus, the necessary band needed is 40 Mbps+60 Mbps=100 Mbps. The band shortage shortage is 100 Mbps−60 Mbps=40 Mbps. It is determined that there is a band shortage. Because of the band shortage, the socket A is subjected to band control. As a result, as shown in FIG. 6B, the actual band of the socket A gradually decreases to 20 Mbps, whereas the actual band of the socket C gradually increases and reaches 40 Mbps.

At the point in time that the actual band of the socket A reaches 20 Mbps, the lower limit network band lower_bps for the priorities higher than the priority 31 of the socket A of interest is 40 Mbps, and the present consumed band current_priority_bps for the priority 31 of the socket A of interest is 20 Mbps. Thus, the necessary band needed is 40 Mbps+20 Mbps=60 Mbps. The band shortage shortage is 60 Mbps−60 Mbps=0 Mbps. Thus, the band shortage is eliminated, and the socket A is thereafter not subjected to band control. Because the socket A is thereafter not subjected to band control even when the actual band of the socket C exceeds 40 Mbps, the amount of communication of the socket C naturally decreases, and the actual band of the socket C converges to 40 Mbps, due to the averaging of communications.

As a result of such band control and the averaging of communications, a transition is made from the state of FIG. 6A to the state of FIG. 6B. Specifically, the actual band of the socket C reaches the specified lower limit band of 40 Mbps, and the actual band of the socket A correspondingly decreases from 60 Mbps to 20 Mbps, whereby stability is achieved.

Figure 7B:
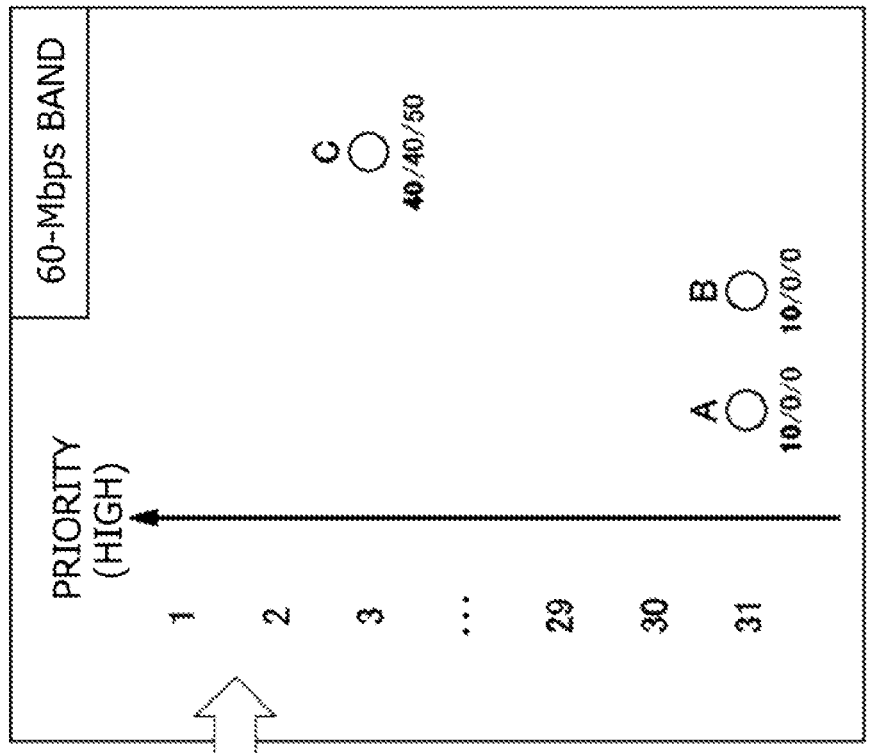
FIG. 7A and FIG. 7B are diagrams of assistance in explaining another example of band control.
Figure 7A:
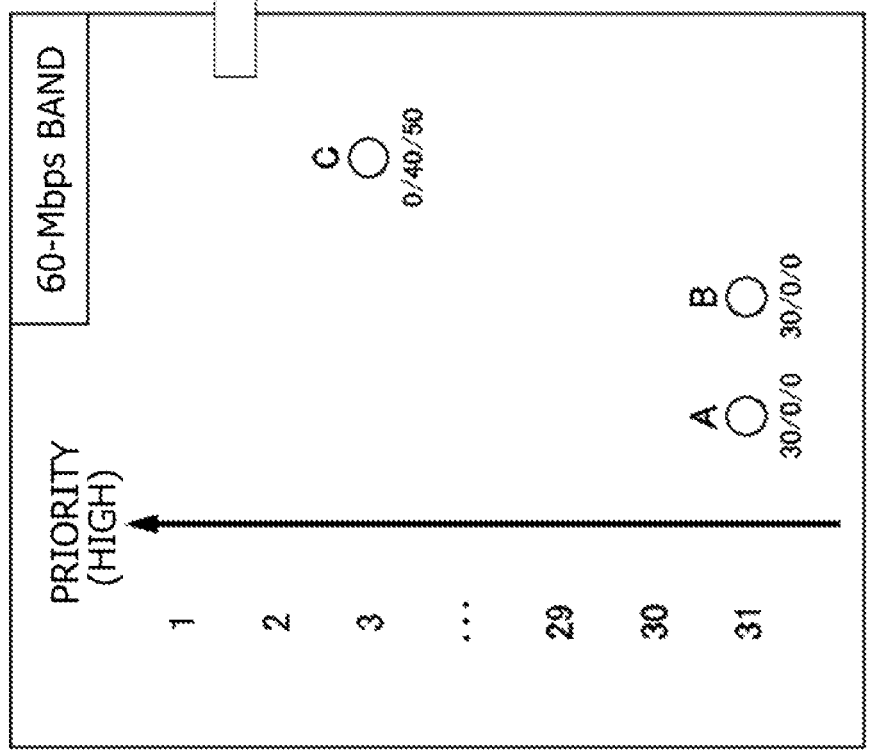

In FIG. 7A and FIG. 7B, the priority of the socket A and the socket B is 31, and the priority of the socket C is 3. In the state of FIG. 7A, the actual band and the limit bands of the socket A are 30/0/0, the actual band and the limit bands of the socket B are 30/0/0, and the actual band and the limit bands of the socket C are 0/40/50. Suppose that the socket C has started communication in this state.

In FIG. 7A, the lower limit network band lower_bps for the priorities higher than the priority 31 of the socket A of interest is 0 Mbps (lower limit network band for the socket C where no communication has occurred is treated as zero). The present consumed band current_priority_bps for the priority 31 of the socket A of interest is 30 Mbps+30 Mbps=60 Mbps. Thus, the necessary band needed is 0 Mbps+60 Mbps=60 Mbps. The band shortage shortage is 60 Mbps−60 Mbps=0 Mbps. It is determined that there is a sufficient band at this point in time.

When the actual band of the socket C becomes 1 Mbps, the lower limit network band lower_bps for the priorities higher than the priority 31 of the socket A of interest is 40 Mbps, and the present consumed band current_priority_bps for the priority 31 of the socket A of interest is 30 Mbps+30 Mbps=60 Mbps. Thus, the necessary band needed is 40 Mbps+60 Mbps=100 Mbps. The band shortage shortage is 100 Mbps−60 Mbps=40 Mbps. It is determined that there is a band shortage. Because of the band shortage, the socket A and the socket B having the same priority 31 are equally subjected to band control. As a result, as shown in FIG. 7B, the actual bands of the socket A and the socket B gradually decrease and each become 10 Mbps, whereas the actual band of the socket C gradually increases and reaches 40 Mbps.

At the point in time that the actual bands of the socket A and the socket B each reach 10 Mbps, the lower limit network band lower_bps for the priorities higher than the priority 31 of the socket A of interest is 40 Mbps, and the present consumed band current_priority_bps for the priority 31 of the socket A of interest is 10 Mbps+10 Mbps=20 Mbps. Thus, the necessary band needed is 40 Mbps+20 Mbps=60 Mbps. The band shortage shortage is 60 Mbps−60 Mbps=0 Mbps. Thus, the band shortage is eliminated, and the socket A and the socket B are thereafter not subjected to band control. Because the socket A and the socket B are thereafter not subjected to band control even when the actual band of the socket C exceeds 40 Mbps, the amount of communication of the socket C naturally decreases, and the actual band of the socket C converges to 40 Mbps, due to the averaging of communications.

As a result of such band control and the averaging of communications, a transition is made from the state of FIG. 7A to the state of FIG. 7B. Specifically, the actual band of the socket C reaches the specified lower limit band of 40 Mbps, and the actual bands of the socket A and the socket B each correspondingly decrease from 30 Mbps to 10 Mbps, whereby stability is achieved.

In FIG. 8A and FIG. 8B, the priority of the socket A and the socket B is 31, and the priority of the socket C is 3. In the state of FIG. 8A, the actual band and the limit bands of the socket A are 0/0/0, the actual band and the limit bands of the socket B are 0/0/0, and the actual band and the limit bands of the socket C are 50/40/50. Suppose that the socket A has started communication in this state. Suppose that the socket A and the socket C perform a communication that uses a band as much as possible.

In FIG. 8A, the lower limit network band lower_bps for the priorities higher than the priority 31 of the socket A of interest is 40 Mbps. The present consumed band current_priority_bps for the priority 31 of the socket A of interest is 0 Mbps. Thus, the necessary band needed is 40 Mbps+0 Mbps=40 Mbps. The band shortage shortage is 40 Mbps−60 Mbps=−20 Mbps. It is determined that there is a sufficient band. Because there is a sufficient band, the socket A is not subjected to band control. As a result, as shown in FIG. 8B, the actual band of the socket A gradually increases and reaches 10 Mbps, whereas the actual band of the socket C is maintained to remain the upper limit band of 50 Mbps because the socket C is not subjected to band control either.

A state transition when the socket A further increases an amount of communication from the state of FIG. 8B is shown in FIG. 9A and FIG. 9B. FIG. 9A shows the same state as in FIG. 8B.

In FIG. 9A, the lower limit network band lower_bps for the priorities higher than the priority 31 of the socket A of interest is 40 Mbps. The present consumed band current_priority_bps for the priority 31 of the socket A of interest is 10 Mbps+0 Mbps=10 Mbps. Thus, the necessary band needed is 40 Mbps+10 Mbps=50 Mbps. The band shortage shortage is 50 Mbps−60 Mbps=−10 Mbps. It is determined that there is a sufficient band. Because there is a sufficient band, the socket A is not subjected to band control. As a result, as shown in FIG. 9B, the actual band of the socket A gradually increases from 10 Mbps to 11 Mbps, 12 Mbps, . . . and reaches 20 Mbps. Meanwhile, the socket C is not subjected to band control either, but the actual band of the socket C gradually decreases from 50 Mbps to 49 Mbps, 48 Mbps, . . . and reaches the lower limit band of 40 Mbps due to the averaging of communications. It is to be noted that this does not result from the band control but results from the averaging of communications.

At the point in time that the actual band of the socket A reaches 20 Mbps, the lower limit network band lower_bps for the priorities higher than the priority 31 of the socket A of interest is 40 Mbps, and the present consumed band current_priority_bps for the priority 31 of the socket A of interest is 20 Mbps+0 Mbps=20 Mbps. Thus, the necessary band needed is 40 Mbps+20 Mbps=60 Mbps. The band shortage shortage is 60 Mbps−60 Mbps=0 Mbps. Thus, there is an exactly sufficient band. When the actual band of the socket A thereafter exceeds 20 Mbps, the band shortage shortage becomes positive, and the socket A is subjected to band control. The actual band of the socket A therefore converges to 20 Mbps. In addition, the actual band of the socket C does not become less than 40 Mbps. When the socket C is about to go in a direction of decreasing from 40 Mbps, it is determined from a viewpoint of a socket having a lower priority than the socket C that the band of the socket C having a higher priority does not satisfy the lower limit network band lower_bps, and a band control operation intended to free a band is performed. The amount of communication of the socket C therefore does not decrease.

As a result of such averaging of communications and the band control, a transition is made from the state of FIG. 9A to the state of FIG. 9B, and stability is achieved in the state of FIG. 9B. Specifically, the actual band of the socket C decreases from 50 Mbps to the specified lower limit band of 40 Mbps, and the actual band of the socket A correspondingly increases from 10 Mbps to 20 Mbps, whereby stability is achieved. The effect of the band control according to the present embodiment is clear from a comparison with a fact that if the band control does not function because the socket A and the socket C have a same priority, for example, or in a case of a system in which a mechanism for the band control is not implemented, the communications of the socket A and the socket C are averaged and both become about 30 Mbps. Incidentally, the "averaging of communications" in this case means that processing is allocated in an average manner in software implementation and that communication speed is regulated by a physical band, and indicates that the communication band is allocated in an average manner even when no particular control is performed.

In FIG. 10A and FIG. 10B, the priority of the socket A is 31, the priority of the socket B is 3, and the priority of the socket C is 2. In the state of FIG. 10A, the actual band and the limit bands of the socket A are 20/0/0, the actual band and the limit bands of the socket B are 40/40/50, and the actual band and the limit bands of the socket C are 0/10/40. Suppose that the socket A, the socket B, and the socket C each perform a communication that uses a band as much as possible in this state.

In FIG. 10A, the lower limit network band lower_bps for the priorities higher than the priority 31 of the socket A of interest is 0 Mbps+40 Mbps=40 Mbps (lower limit network band for the socket C where no communication has occurred is treated as zero). The present consumed band current_priority_bps for the priority 31 of the socket A of interest is 20 Mbps. Thus, the necessary band needed is 40 Mbps+20 Mbps=60 Mbps. The band shortage shortage is 60 Mbps−60 Mbps=0 Mbps. It is determined that there is a sufficient band.

The lower limit network band lower_bps for the priorities higher than the priority 3 of the socket B of interest is 0 Mbps. The present consumed band current_priority_bps for the priority 3 of the socket B of interest is 40 Mbps. Thus, the necessary band needed is 0 Mbps+40 Mbps=40 Mbps. The band shortage shortage is 40 Mbps−60 Mbps=−20 Mbps. It is determined that there is a sufficient band.

The lower limit network band lower_bps for the priority higher than the priority 2 of the socket C of interest is 0 Mbps. The present consumed band current_priority_bps for the priority 2 of the socket C of interest is 0 Mbps. Thus, the necessary band needed is 0 Mbps+0 Mbps=0 Mbps. The band shortage shortage is 0 Mbps−60 Mbps=−60 Mbps. It is determined that there is a sufficient band.

Suppose that the socket C performs communication at 1 Mbps in this state. At this time, the lower limit network band lower_bps for the priorities higher than the priority 31 of the socket A of interest is 10 Mbps+40 Mbps=50 Mbps, and the present consumed band current_priority_bps for the priority 31 of the socket A of interest is 20 Mbps. Thus, the necessary band needed is 50 Mbps+20 Mbps=70 Mbps. The band shortage shortage is 70 Mbps−60 Mbps=10 Mbps. It is determined that there is a band shortage. Because of the band shortage, the socket A is subjected to band control. The actual band of the socket A starts to decrease gradually.

The lower limit network band lower_bps for the priorities higher than the priority 3 of the socket B of interest is 10 Mbps. The present consumed band current_priority_bps for the priority 3 of the socket B of interest is 40 Mbps. Thus, the necessary band needed is 10 Mbps+40 Mbps=50 Mbps. The band shortage shortage is 50 Mbps−60 Mbps=−10 Mbps. It is determined that there is a sufficient band.

The lower limit network band lower_bps for the priority higher than the priority 2 of the socket C of interest is 0 Mbps. The present consumed band current_priority_bps for the priority 2 of the socket C of interest is 1 Mbps. Thus, the necessary band needed is 0 Mbps+1 Mbps=1 Mbps. The band shortage shortage is 1 Mbps−60 Mbps=−59 Mbps. It is determined that there is a sufficient band.

Suppose that while the socket A is subjected to band control, the socket C further increases the amount of communication, so that the actual band of the socket C has reached 10 Mbps. At this time, the lower limit network band lower_bps for the priorities higher than the priority 31 of the socket A of interest is 10 Mbps+40 Mbps=50 Mbps, and the present consumed band current_priority_bps for the priority 31 of the socket A of interest is 10 Mbps. Thus, the necessary band needed is 50 Mbps+10 Mbps=60 Mbps. The band shortage shortage is 60 Mbps−60 Mbps=0 Mbps. Thus, there is an exactly sufficient band. The band shortage is eliminated, and the socket A is thereafter not subjected to band control.

The lower limit network band lower_bps for the priorities higher than the priority 3 of the socket B of interest is 10 Mbps. The present consumed band current_priority_bps for the priority 3 of the socket B of interest is 40 Mbps. Thus, the necessary band needed is 10 Mbps+40 Mbps=50 Mbps. The band shortage shortage is 50 Mbps−60 Mbps=−10 Mbps. It is determined that there is a sufficient band.

The lower limit network band lower_bps for the priority higher than the priority 2 of the socket C of interest is 0 Mbps. The present consumed band current_priority_bps for the priority 2 of the socket C of interest is 10 Mbps. Thus, the necessary band needed is 0 Mbps+10 Mbps=10 Mbps. The band shortage shortage is 10 Mbps−60 Mbps=−50 Mbps. It is determined that there is a sufficient band.

Even when the amount of communication of the socket C hereafter further increases to 11 Mbps, the socket A and the socket B are not subjected to band control. Thus, due to the averaging of communications, opportunities for communication are relatively allocated to the socket A and the socket B. Consequently, the amount of communication of the socket C decreases naturally, and the actual band of the socket C is stabilized at 10 Mbps. It is to be noted that this is an effect of the averaging of communications rather than the band control.

As a result of such band control and the averaging of communications, a transition is made from the state of FIG. 10A to the state of FIG. 10B. Specifically, the actual band of the socket C reaches the specified lower limit band of 10 Mbps, and the actual band of the socket A correspondingly decreases from 20 Mbps to 10 Mbps, whereby stability is achieved.

To summarize, the socket A advances in a direction of narrowing the actual band from 20 Mbps according to the band control because the socket C having a higher priority has started communication. The socket B has a higher priority than the socket A. Thus, as a result of calculation of band determination, the socket B does not narrow the actual band in this case. The socket C advances from 0 Mbps to 1, 2, . . . , 10 Mbps due to the averaging of communications. When the socket C exceeds 10 Mbps, the socket C satisfies the lower limit band as viewed from the other sockets, and it is determined that no further band control is necessary. As a result, bands are allocated to the sockets other than the socket C, whereby the actual band of the socket C naturally converges to 10 Mbps.

Figures 11A, 11B:
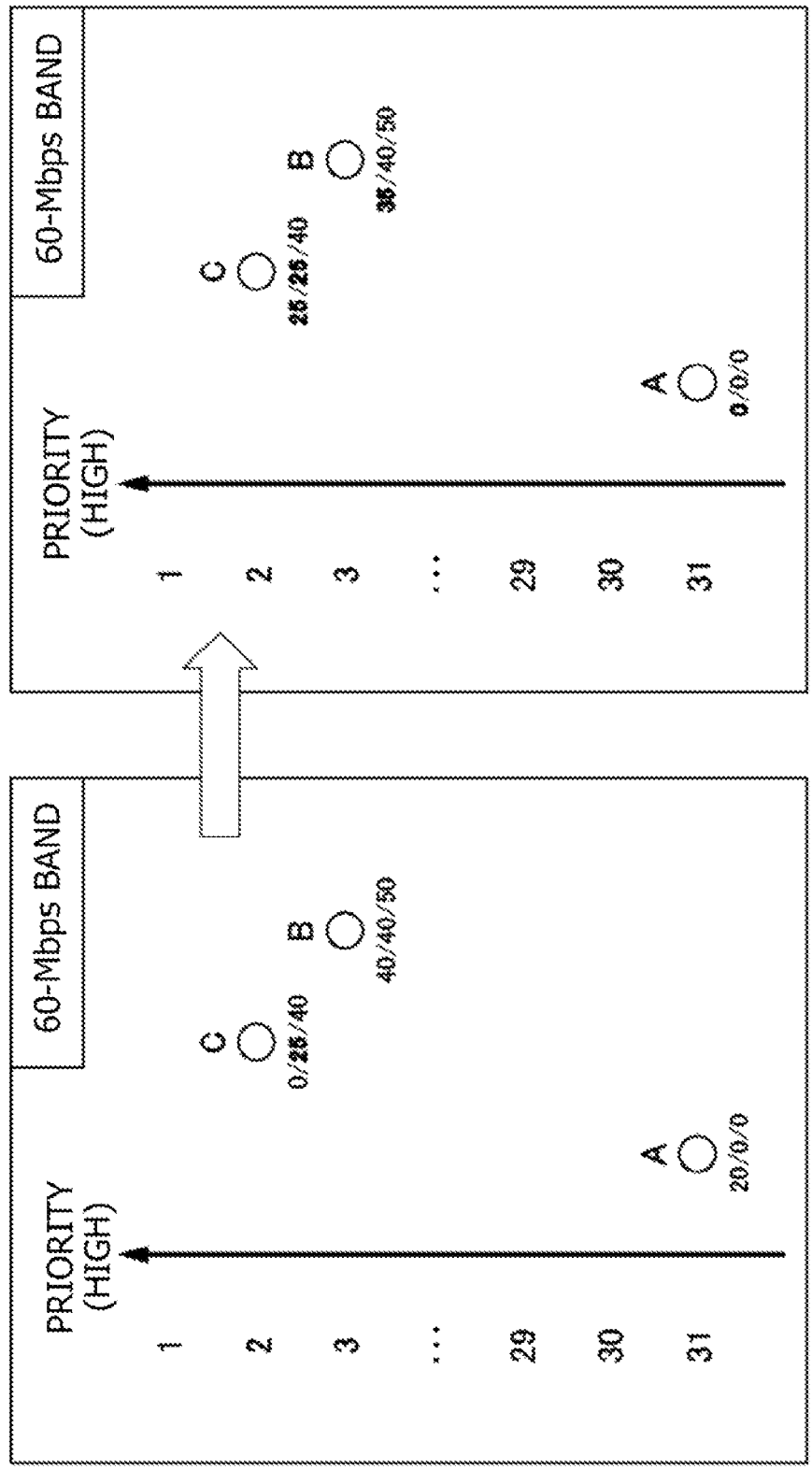
FIG. 11A and FIG. 11B are diagrams of assistance in explaining another example of band control.

In FIG. 11A and FIG. 11B, the priority of the socket A is 31, the priority of the socket B is 3, and the priority of the socket C is 2. In the state of FIG. 11A, the actual band and the limit bands of the socket A are 20/0/0, the actual band and the limit bands of the socket B are 40/40/50, and the actual band and the limit bands of the socket C are 0/25/40. Suppose that the socket A, the socket B, and the socket C each perform a communication that uses a band as much as possible in this state.

As in the state of FIG. 10A, in the state of FIG. 11A, the band shortage shortage with respect to the socket A, the socket B, and the socket C is zero or less, and it is thus determined that there is a sufficient band.

Suppose that the socket C performs communication at 1 Mbps in this state. At this time, the lower limit network band lower_bps for the priorities higher than the priority 31 of the socket A of interest is 25 Mbps+40 Mbps=65 Mbps, and the present consumed band current_priority_bps for the priority 31 of the socket A of interest is 20 Mbps. Thus, the necessary band needed is 65 Mbps+20 Mbps=85 Mbps. The band shortage shortage is 85 Mbps−60 Mbps=25 Mbps. It is determined that there is a band shortage. Because of the band shortage, the socket A is subjected to band control. The actual band of the socket A starts to decrease.

The lower limit network band lower_bps for the priorities higher than the priority 3 of the socket B of interest is 25 Mbps. The present consumed band current_priority_bps for the priority 3 of the socket B of interest is 40 Mbps. Thus, the necessary band needed is 25 Mbps+40 Mbps=65 Mbps. The band shortage shortage is 65 Mbps−60 Mbps=5 Mbps. It is determined that there is a band shortage. Because of the band shortage, the socket B is subjected to band control. The actual band of the socket B starts to decrease.

The lower limit network band lower_bps for the priority higher than the priority 2 of the socket C of interest is 0 Mbps. The present consumed band current_priority_bps for the priority 2 of the socket C of interest is 1 Mbps. Thus, the necessary band needed is 0 Mbps+1 Mbps=1 Mbps. The band shortage shortage is 1 Mbps−60 Mbps=−59 Mbps. It is determined that there is a sufficient band.

The socket A and the socket B are both subjected to band control. However, because the socket A has a lower priority than the socket B, the band of the socket A is controlled more. Meanwhile, the socket C is not subjected to band control, and therefore further increases the amount of communication. Suppose that the actual band of the socket C has reached 25 Mbps, that the actual band of the socket B has decreased to 35 Mbps, and that the actual band of the socket A has decreased to 0 Mbps. At this time, the lower limit network band lower_bps for the priorities higher than the priority 31 of the socket A of interest is 25 Mbps+40 Mbps=65 Mbps, and the present consumed band current_priority_bps for the priority 31 of the socket A of interest is 0 Mbps. Thus, the necessary band needed is 65 Mbps+0 Mbps=65 Mbps. The band shortage shortage is 65 Mbps−60 Mbps=5 Mbps. It is determined that there is a band shortage. However, because the actual band of the socket A is already 0 Mbps, the band of the socket A does not decrease further.

The lower limit network band lower_bps for the priorities higher than the priority 3 of the socket B of interest is 25 Mbps. The present consumed band current_priority_bps for the priority 3 of the socket B of interest is 35 Mbps. Thus, the necessary band needed is 25 Mbps+35 Mbps=60 Mbps. The band shortage shortage is 60 Mbps−60 Mbps=0 Mbps. Thus, there is an exactly sufficient band. The socket B is thereafter not subjected to band control.

The lower limit network band lower_bps for the priority higher than the priority 2 of the socket C of interest is 0 Mbps. The present consumed band current_priority_bps for the priority 2 of the socket C of interest is 25 Mbps. Thus, the necessary band needed is 0 Mbps+25 Mbps=25 Mbps. The band shortage shortage is 25 Mbps−60 Mbps=−35 Mbps. It is determined that there is a sufficient band.

Even when the amount of communication of the socket C hereafter further increases from 25 Mbps, the socket B is not subjected to band control. The actual band of the socket A is already 0 Mbps. Thus, due to the averaging of communications, opportunities for communication are relatively allocated to the socket B. Consequently, the amount of communication of the socket C decreases naturally, and the actual band of the socket C is stabilized at 25 Mbps. It is to be noted that this is an effect of the averaging of communications rather than the band control.

As a result of such band control and the averaging of communications, a transition is made from the state of FIG. 11A to the state of FIG. 11B. Specifically, the actual band of the socket C reaches the specified lower limit band of 25 Mbps, and correspondingly the actual band of the socket A decreases from 20 Mbps to 0 Mbps and the actual band of the socket B decreases from 40 Mbps to 35 Mbps, whereby stability is achieved.

To summarize, the socket A advances in a direction of narrowing the actual band from 20 Mbps to 0 Mbps according to the band control because the socket C having a higher priority has started communication. The socket B also advances in a direction of narrowing the actual band from 40 Mbps according to the band control. However, because the socket B has a higher priority than the socket A, the socket B is limited to a decrease of 5 Mbps. The socket C advances from 0 Mbps to 1, 2, . . . , 25 Mbps due to the averaging of communications. When the socket C exceeds 25 Mbps, the socket C satisfies the lower limit band as viewed from the other sockets, and it is determined that no further band control is necessary. As a result, bands are allocated to the sockets other than the socket C, whereby the actual band of the socket C naturally converges to 25 Mbps.

The foregoing embodiment has been described by assuming socket communications and taking socket IDs uniquely identifying sockets as an example. However, other identifying information that can uniquely identify communication units may be used. Socket IDs are low-level IDs as viewed from an application. However, high-level IDs such as Hypertext Transfer Protocol (HTTP) IDs may be used as communication unit identifying information. Here, an HTTP ID is an identifier as a set of the setting information of a connection destination such as the host name of a server, a port number, and the like, the type information of a method such as a get method, a post method, and the like, the path information of an HTTP URI (Uniform Resource Identifier), and the like. In the case of socket IDs, the band control according to the present embodiment needs to be implemented in a kernel. However, at an HTTP level, the band control according to the present embodiment can be implemented in a user space, and the kernel does not need to be changed. In a case of implementation at the HTTP level, when an amount of communication in an HTTP library or a process is known, the value can be used in place of the maximum band of a network interface.

As described above, according to the present embodiment, a priority and a requested band can be provided for each communication unit, and a network band can be allocated to a plurality of communications appropriately. A situation can be avoided in which the network band is occupied by a particular communication of a game application, system software, or the like and the network band cannot be sufficiently allocated to other communications.

In addition, the present embodiment does not secure a certain band at all times to ensure a network band for a particular communication even though the particular communication does not actually use the network band. Other communications are accommodated with the unused network band. In addition, when a communication unit not using a network band has started to use a band, the network band can be dynamically allocated by narrowing the bands used by other communication units.

In addition, the present embodiment estimates the maximum band of a network from actual amounts of transmission and reception. Thus, even when a network band on a Wide Area Network (WAN) side is different as in a network environment of each household, identical band control can be applied.

In addition, according to the present embodiment, socket communications can be grouped according to applied policies, and a different policy can be applied to each group of socket communications. When a socket is generated on an application side, a policy to be applied to the socket communication can be determined by setting a policy number. An operating system arbitrarily assigns a socket ID each time an application is started. However, when application software is configured to set the policy number of a socket using a setsockopt( ) function or the like, even though the system assigns an arbitrary socket ID, the policy of the same policy number can be applied to the socket communication. Incidentally, it suffices to set the contents of the policy identified by the policy number separately afterward independently of the application. That is, an application developer can emulate a communication for a policy number determined by the application developer or allowed to be known to the application developer.

The present technology has been described above on the basis of embodiments thereof. The foregoing embodiments are illustrative, and it is to be understood by those skilled in the art that combinations of constituent elements and processing processes of the embodiments are susceptible of various modifications and that such modifications also fall within the scope of the present technology.

The foregoing embodiment has been described by taking band control as an example. However, control other than band control may be applied to sockets grouped according to differences in applied policy. For example, a policy group of socket communications may be subjected to access control or service quality control. Socket communications of a certain policy group may be subjected to access control so as to limit access to the Internet or an external server and allow only communication within a local area network.

The present disclosure contains subject matter related to that disclosed in Japanese Priority Patent Application JP 2013-120236 filed in the Japan Patent Office on Jun. 6, 2013, the entire content of which is hereby incorporated by reference.

What is claimed is:

1. A communication processing device comprising:
   a memory device storage section configured to store a policy table having a plurality of entries, where each entry associates: (i) a communication unit identifier that identifies one of a plurality of communication units of the communication device, each of the plurality of communication units employing one of a plurality of communication protocols; (ii) a policy identifier, which defines an upper bandwidth usage limit and a lower bandwidth usage limit within which the given communication unit should operate; and (iii) a priority indicator, which defines priorities among the plurality of communication units as to usage of a communication network over which the communication processing device communicates data;
   an obtaining circuit configured to refer to the policy table and obtain the communication unit identifiers, the policy identifiers and the priority identifiers for each entry of the policy table, where the entries of the policy table are made at a respective times of protocol processing of the communication units;
a policy applying circuit, in communication with the obtaining circuit, configured to group communication units having identical policy identifiers, and to apply a respective identical policy to resultant groups of communication units; and
a band control circuit executing an algorithm configured to allocate a bandwidth of the communication network to the communications units having identical policy identifiers with preference to those having higher priority identifiers.

2. The communication processing device according to claim 1, wherein:
a requested band of the communication network is associated with the policy identifier in the policy table, and
the band control circuit performs band control under the requested band on the communications units having identical policy identifiers.

3. The communication processing device according to claim 2, wherein the band control circuit performs band control such that the requested band is shared among the communication units having identical policy identifiers.

4. The communication processing device according to claim 2, wherein the band control circuit performs band control such that the requested band is used by each of the communication units having identical policy identifiers.

5. The communication processing device according to claim 1, wherein when a sum of a requested band of a first communication unit among the plurality of communications units having a higher priority identifier than a priority for a second communication unit among the plurality of communications units, and a consumed band of the second communication unit is larger than a maximum band of the communication network, the band control circuit performs band control on the second communication unit.

6. The communication processing device of claim 1, wherein when a respective band of the bandwidth that is allocated and used by a respective one of the communication units is less than a lower bandwidth usage limit thereof, and when there is some remaining portion of the bandwidth before the lower bandwidth usage limit is reached, any of the communication units having lower priority are not allocated with the remaining portion of the bandwidth.

7. A communication processing method comprising:
storing a policy table having a plurality of entries, where each entry associates: (i) a communication unit identifier that identifies one of a plurality of communication units of a communication device, each of the plurality of communication units employing one of a plurality of communication protocols; (ii) a policy identifier, which defines an upper bandwidth usage limit and a lower bandwidth usage limit within which the given communication unit should operate; and (iii) a priority indicator, which defines priorities among the plurality of communication units as to usage of a communication network over which the communication processing device communicates data;
referring to the policy table and obtaining the communication unit identifiers, the policy identifiers and the priority identifiers for each entry of the policy table, where the entries of the policy table are made at a respective times of protocol processing of the communication units;
grouping communication units having identical policy identifiers, and applying a respective identical policy to resultant groups of communication units; and
executing an algorithm configured to allocate a bandwidth of the communication network to the communications units having identical policy identifiers with preference to those having higher priority identifiers.

8. A non-transitory, computer readable storage medium containing a program for a computer, which when executed causes the computer to carry out actions, comprising:
storing a policy table having a plurality of entries, where each entry associates: (i) a communication unit identifier that identifies one of a plurality of communication units of a communication device, each of the plurality of communication units employing one of a plurality of communication protocols; (ii) a policy identifier, which defines an upper bandwidth usage limit and a lower bandwidth usage limit within which the given communication unit should operate; and (iii) a priority indicator, which defines priorities among the plurality of communication units as to usage of a communication network over which the communication processing device communicates data;
referring to the policy table and obtaining the communication unit identifiers, the policy identifiers and the priority identifiers for each entry of the policy table, where the entries of the policy table are made at a respective times of protocol processing of the communication units;
grouping communication units having identical policy identifiers, and applying a respective identical policy to resultant groups of communication units; and
executing an algorithm configured to allocate a bandwidth of the communication network to the communications units having identical policy identifiers with preference to those having higher priority identifiers.

9. A computer having a microprocessor executing a computer program, which causes the computer to execute actions, comprising:
storing a policy table having a plurality of entries, where each entry associates: (i) a communication unit identifier that identifies one of a plurality of communication units of a communication device, each of the plurality of communication units employing one of a plurality of communication protocols; (ii) a policy identifier, which defines an upper bandwidth usage limit and a lower bandwidth usage limit within which the given communication unit should operate; and (iii) a priority indicator, which defines priorities among the plurality of communication units as to usage of a communication network over which the communication processing device communicates data;
referring to the policy table and obtaining the communication unit identifiers, the policy identifiers and the priority identifiers for each entry of the policy table, where the entries of the policy table are made at a respective times of protocol processing of the communication units;
grouping communication units having identical policy identifiers, and applying a respective identical policy to resultant groups of communication units; and
executing an algorithm configured to allocate a bandwidth of the communication network to the communications units having identical policy identifiers with preference to those having higher priority identifiers.

\* \* \* \* \*